Jan. 1, 1963 J. A. HENNING 3,071,398
LOCKING RING
Filed May 27, 1960 2 Sheets-Sheet 1
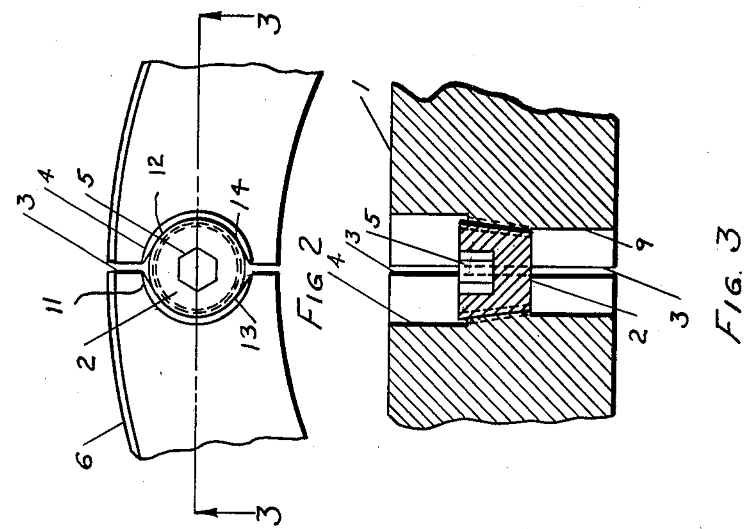
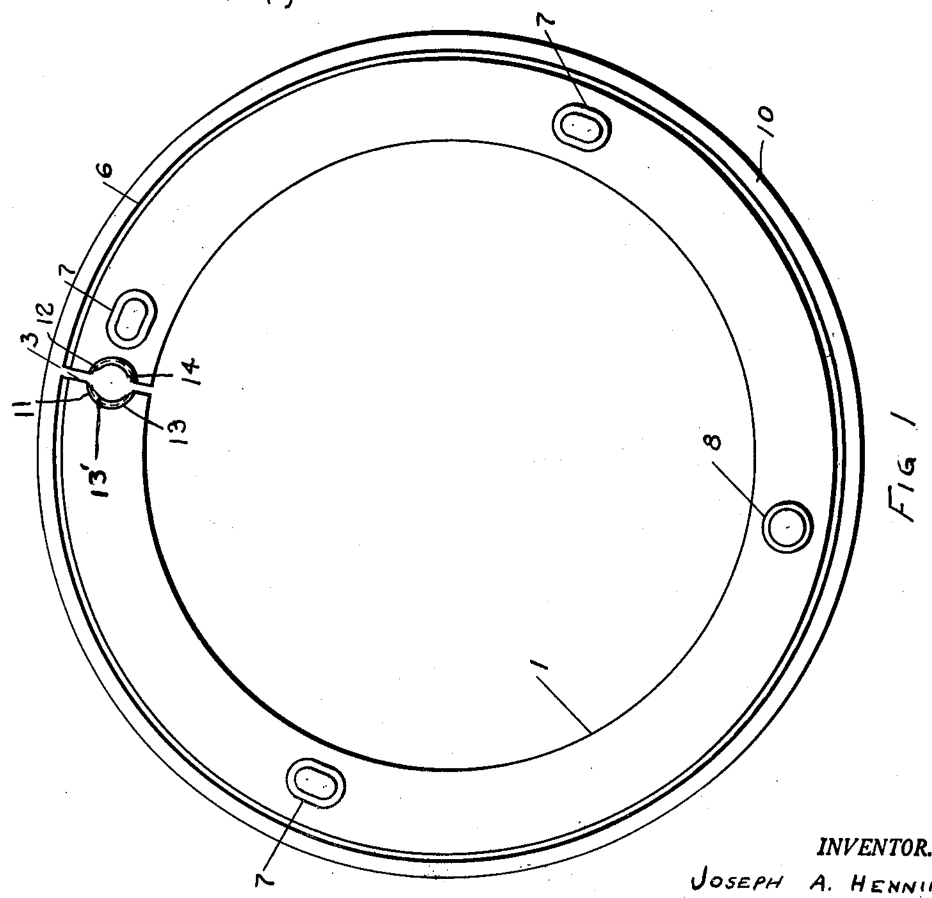
INVENTOR.
JOSEPH A. HENNING
BY
Charles L. Lowenhuk
Attorney Jan. 1, 1963 J. A. HENNING 3,071,398

LOCKING RING

Filed May 27, 1960 2 Sheets-Sheet 2

INVENTOR.
JOSEPH A. HENNING
BY
Charles L. Lounsbach
attorney

United States Patent Office 3,071,398

Patented Jan. 1, 1963

1

3,071,398
LOCKING RING

Joseph A. Henning, Erie, Pa., assignor to Skinner Engine Company, Erie, Pa., a corporation of Pennsylvania Filed May 27, 1960, Ser. No. 32,171
5 Claims. (Cl. 287—52.06)

This invention relates to mixers and, more particularly, to improved means for holding the end shields in place in Banbury type mixers.

In Banbury mixers such as the mixer shown in Patent No. 2,299,502, a problem exists in holding the locking ring for the end shield of the mixer in rigid position. Various locking devices have been provided; however, the locking or spreading devices used are limited in the amount they can expand and are otherwise unsatisfactory.

It is, accordingly, an object of the present invention to overcome the above and other defects in locking devices and, more particularly, it is an object to provide a locking device which is simple in construction, economical to manufacture, and simple and efficient in operation.

Another object of the invention is to provide an improved locking device.

Still another object of the invention is to provide an improved locking device in combination with a Banbury type mixer.

A further object of the invention is to provide an improved expanding device for a locking member.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

FIG. 1 is an end view of a locking device according to the invention;

FIG. 2 is an enlarged view of the locking device shown in FIG. 1;

FIG. 3 is a cross sectional view taken on line 3—3 of FIG. 2; and

Figure 4:
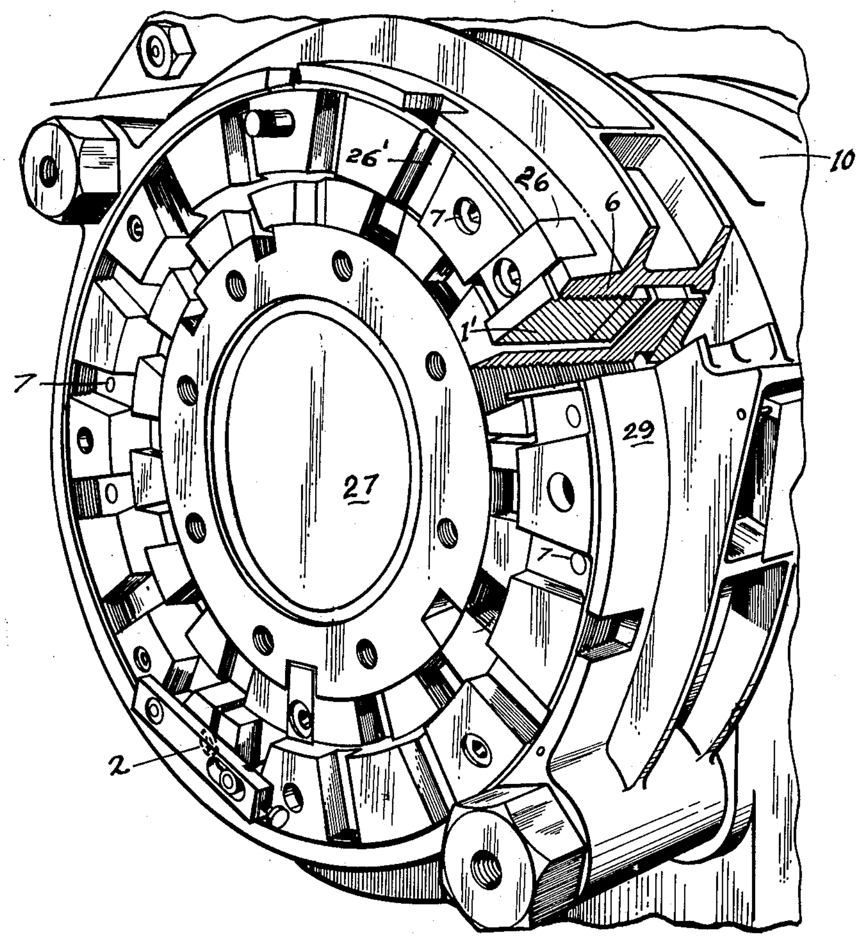
FIG. 4 shows a part of a mixer of the type shown in Patent No. 2,705,653 with a ring similar to the ring shown herein installed therein.

Now with more specific reference to the drawing, a Banbury type mixer is indicated generally at 10 with a locking ring 1 supported therein. The locking ring 1 is an annular member made of flat material having a slot 3 cut in one portion thereof with a threaded hole 13' therein.

FIG. 4 shows an enlarged partial view of a mixer with a ring 1' similar to ring 1 installed therein. The ring is exactly like ring 1 except it has a plurality of slots 26' cut therein for receiving lugs 26. The ring 1' can be adjusted in the counterbore in end shield 29 to oppose end thrust of the rotors on shaft 27.

The outer periphery of the ring 1 is threaded at 6 to engage internal threads in the mixer 10 to hold it in place against the terrific pressures which will be exerted thereon by the compressed material therein.

The ring 1 is supported to the mixer 10 by bolts received in holes 7 and 8. The outer end of the hole 13' is counterbored at 4 and the inner end of the hole 13' is counterbored at 9.

The locking ring 1 has spaced elongated tapered holes 7 along the sides and at the top thereof so that the ring 1 can move slightly to adjust itself on the bolts which hold it in position. The holes 7 could be made slightly oversize rather than elongated as shown.

2

The threads in threaded hole 13' would normally grip the tapered plug 2 as it is driven into the threaded opening and, therefore, limit the amount that the plug 2 could be driven in. The tapered plug 2 has a conventional driving hole 5 which may be of conventional shape to receive a suitable wrench for rotating the plug.

In the present invention, the threads are relieved at 11, 12, 13 and 14 so that the plug 2 can be driven farther into the ring 1 to spread it a greater amount before the edges of the threads adjacent slots 3 lock and bind against the outer periphery of the plug 2.

It has been discovered that in order to have a satisfactory gripping of the plug 2 on the threads, the threads should be relieved between approximately thirty and forty-five degrees between the points 11, 12, 13 and 14 and the slots 3 so that a crescent shaped thread crest remains. By relieving the threads as indicated, the plug 2 can be driven farther through the ring 1 and, therefore, the ring can be expanded a greater amount than with previous devices of this nature.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A locking device comprising two spreadable members having a hole formed half in one said member and half in the other said member, threads in said hole, and a tapered plug received in said threads to be driven inwardly or outwardly of said threaded hole to spread and contract said members, said threads being removed adjacent each side of said hole adjacent the edges of said members, leaving two crescent shaped surfaces at the lower end of said hole.

2. The device recited in claim 1 wherein said threads are removed to the extent of approximately forty-five degrees on the end of each half of said threads.

3. A locking ring for being received in the end of an open cylinder comprising an annular member split at one side, a tapered hole formed in said annular member, half of said hole being in one side of said split and the other half in the other half of said annular member, and a tapered thread in said hole, said thread being removed to the extent of approximately forty-five degrees adjacent said split.

4. A locking ring comprising an annular member having means on the periphery thereof to engage the inner periphery of an open cylinder, spaced enlarged holes for receiving bolts to lock said ring to the end of said cylinder, said ring being split, a tapered threaded hole in said ring, half of said hole being disposed in each side of said split, said threads being removed adjacent said split to the extent of an arc of approximately forty-five degrees, and a tapered plug received in said threaded hole.

5. A ring in combination with an open cylinder, threads on the periphery of said ring, said ring being split and having a threaded hole, half of said hole being disposed in each side of said split, a tapered plug in said hole, and a counterbore outward of said threads and a counterbore inward of said threads, said threads being removed adjacent said split on each side of said hole over an arc of the extent of approximately forty-five degrees.

References Cited in the file of this patent

UNITED STATES PATENTS

| | | |
|---|---|---|
| 1,075,849 | Partridge | Oct. 14, 1913 |
| 2,491,128 | Nelson | Dec. 13, 1949 |